H. R. STETLER.
GREASE RETAINER.
APPLICATION FILED JAN. 15, 1916.
1,203,428.
Patented Oct. 31, 1916.
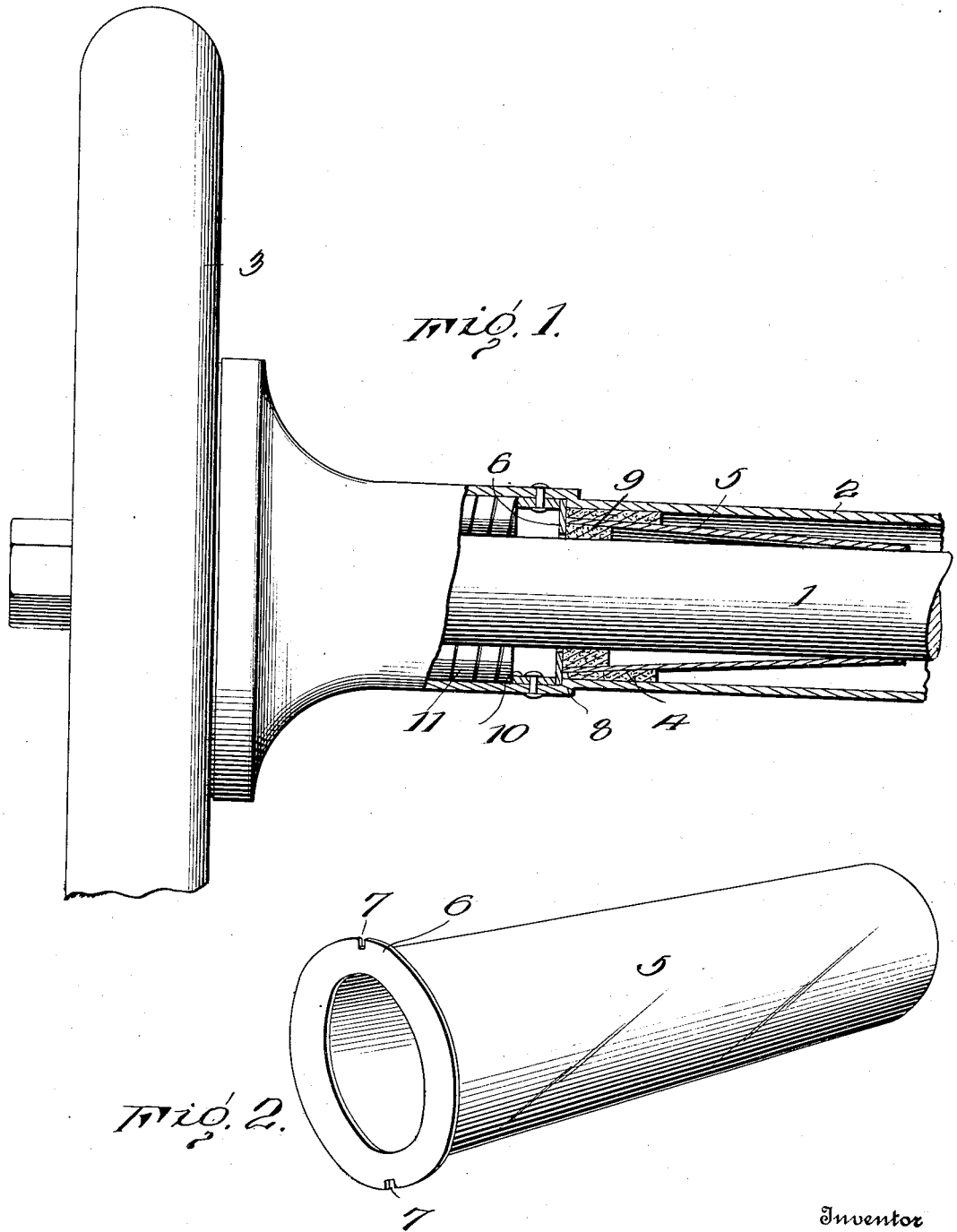
Inventor
H. R. Stetler

UNITED STATES PATENT OFFICE.

HUBERT RAY STETLER, OF JACKSON, MICHIGAN.

GREASE-RETAINER.

1,203,428.  Specification of Letters Patent.  Patented Oct. 31, 1916.

Application filed January 15, 1916. Serial No. 72,276.

*To all whom it may concern:*

Be it known that I, HUBERT RAY STETLER, a citizen of the United States, residing at Jackson, in the county of Jackson and State of Michigan, have invented certain new and useful Improvements in Grease-Retainers, of which the following is a specification.

This invention has for its object the provision of a device which may be inexpensively produced and easily applied to the rear axle of an automobile to prevent the lubricant supplied to the differential gearing from passing through the outer end of the axle casing and dripping over the wheel and tire.

A device which will accomplish the stated object is illustrated in the accompanying drawings and the invention resides in certain novel features which will be hereinafter first fully described and then more particularly pointed out in the appended claims.

In the drawings: Figure 1 is a longitudinal section of a portion of an axle spindle and axle housing with my improved device applied thereto; Fig. 2 is a detail perspective view of the retainer tube.

In the accompanying drawings, 1 designates the axle spindle, 2, the housing fitting around the spindle and spaced therefrom while 3 indicates a portion of the automobile wheel. In carrying out my invention, I employ a washer or ring 4 of felt or similar absorbent material and insert the said washer in the end of the housing 2 around the spindle. Before inserting the said washer, I tie around the same a cord which will be long enough to permit the end to be easily grasped and held while the other parts are being placed in position. I also employ a tube 5 which is of a frusto-conical form and is provided at its outer wider end with an annular flange 6 formed with notches 7. After the washer 4 is in place, the retainer tube 5 is inserted through the washer and into the housing, the cord which has been tied around the washer being drawn through a notch 7 and held. The retainer tube is pushed in until the annular flange 6 thereon abuts the annular shoulder 8 of the axle housing, after which the before-mentioned cord is drawn so as to pull the washer 4 compactly into the space between the retainer tube and the axle housing and against the outer portion of the flange 6. The cord is then cut off close to the flange 6, as will be readily understood. I then slip through the opening in the flange 6 a second washer 9 which is of the same construction as the washer 4, which washer will be compressed between the spindle and the retainer tube and against the flange. The bearing retainer ring 10 is then inserted in the axle housing and against the outer face of the flange 6 and secured in the usual manner, after which the roller bearings 11 may be placed in position as is now customary.

It will be readily noted from the foregoing description taken in connection with the accompanying drawings that I have provided an exceedingly simple and inexpensive device which may be readily applied to the axle housing of an automobile and efficiently prevent grease or lubricant escaping around the spindle. The felt washers will be compressed between the retainer tube and the housing and spindle respectively and this tube will be positively held in place by the bearing retaining ring 10, as shown and previously stated. The pressure of the grease upon the inner ends of the washers will serve to drive them against the flange 6 and, as this flange will be held immovably in place by the retaining ring 10, it is evident that the greater the pressure from the grease upon the washers, the more compactly will the washers fit around the spindle and against the housing so that the leaking of the grease will be positively prevented.

Having thus described my invention, what I claim as new is:

1. A device for the purpose set forth comprising a retainer tube having a flange at one end, and absorbent washers fitted respectively around and within the said tube against the flange.

2. The combination with an automobile spindle and axle housing, of a retainer tube of larger diameter at its outer end than at its inner end inserted within the housing and around the spindle and having an annular flange at its outer end adapted to abut the axle housing, and absorbent washers fitted respectively around and within the said tube and against the said flange.

3. Means for preventing the escape of lubricant from an axle housing comprising a tube having an annular flange at one end provided with a notch on its outer edge, and absorbent washers adapted to respectively encircle said tube and fit within the same against the said flange.

4. Means for preventing the escape of lubricant from an axle housing comprising a frusto-conical tube adapted to be inserted in the end of the housing, absorbent washers fitting around and within the larger end of the tube, and means for securing the tube in the housing.

In testimony whereof, I affix my signature.

HUBERT RAY STETLER. [L. S.]